(12) United States Patent
Loo

(10) Patent No.: US 6,994,336 B2
(45) Date of Patent: Feb. 7, 2006

(54) COUNTER-MOUNTABLE CUTTING BOARD

(76) Inventor: Yeng Way Loo, 88 Hampstead Hill N.W., Calgary, Alberta (CA) T3A 6G8

( * ) Notice: Subject to any disclaimer, the term of this patent is extended or adjusted under 35 U.S.C. 154(b) by 0 days.

(21) Appl. No.: 10/975,482

(22) Filed: Oct. 29, 2004

(65) Prior Publication Data
US 2005/0110203 A1 May 26, 2005

(30) Foreign Application Priority Data
Nov. 20, 2003 (CA) .................... 2449313

(51) Int. Cl.
B23Q 3/00 (2006.01)
(52) U.S. Cl. .............. 269/302.1; 269/289 R
(58) Field of Classification Search ............ 269/302.1, 269/289 R, 900
See application file for complete search history.

(56) References Cited

U.S. PATENT DOCUMENTS

| 1,743,763 | A |   | 1/1930  | Erickson             |
|-----------|---|---|---------|----------------------|
| D159,881  | S |   | 8/1950  | Zekowski             |
| D161,596  | S |   | 1/1951  | Russ                 |
| 3,598,164 | A |   | 8/1971  | August               |
| 4,118,021 | A | * | 10/1978 | DeLomba ...... 269/86 |
| D259,166  | S |   | 5/1981  | Krusche              |
| 4,305,166 | A |   | 12/1981 | Rose                 |
| 4,318,537 | A | * | 3/1982  | Dorman et al. ....... 269/302.1 |
| 4,456,021 | A |   | 6/1984  | Leavens              |
| D283,777  | S |   | 5/1986  | Morin                |
| 4,653,737 | A |   | 3/1987  | Haskins et al.       |
| 4,765,603 | A |   | 8/1988  | Huppert              |
| D376,737  | S |   | 12/1996 | Hecker               |
| 5,865,105 | A |   | 2/1999  | Pepelanov            |
| 5,904,271 | A |   | 5/1999  | Collins et al.       |
| D415,661  | S |   | 10/1999 | Georgeovich          |
| 5,996,983 | A | * | 12/1999 | Laurenzi ...... 269/15 |
| 6,026,972 | A |   | 2/2000  | Makowski             |
| 6,341,770 | B1 | * | 1/2002  | Landherr ...... 269/289 R |
| 6,702,273 | B1 | * | 3/2004  | Sellers ...... 269/289 R |
| 2003/0218290 | A1 | * | 11/2003 | Goldberg et al. ...... 269/289 R |
| 2005/0110203 | A1 | * | 5/2005  | Loo ...... 269/289 R |

FOREIGN PATENT DOCUMENTS

| CA | 2052422     | 3/1993  |
| EP | 0335657     | 10/1989 |
| EP | 1252849 A1  | 10/2002 |
| GB | 2264224 A   | 8/1993  |
| GB | 2355920     | 5/2001  |
| JP | 8308752     | 11/1996 |
| WO | WO 97/40730 | 11/1997 |

* cited by examiner

Primary Examiner—Lee D. Wilson
(74) Attorney, Agent, or Firm—Thomas E. Malyszko

(57) ABSTRACT

A cutting board has a cutting platform and a clamp assembly to securely mount the cutting board to a counter edge. The cutting platform has an elevated planar cutting surface supported on a narrower base. The cutting board includes a removable receptacle for location over a sink, and hook features for hanging trash bags. The cutting board uses the narrow counter space located at the front of the sink to provide a useful cutting or chopping surface. The board occupies very little sink space and allows access to the sink and water taps for other washing chores once it is mounted to the counter. The clamp assembly hooks or clamps around the counter edge to prevent the cutting board from toppling during use.

19 Claims, 4 Drawing Sheets

COUNTER-MOUNTABLE CUTTING BOARD

FIELD OF THE INVENTION

The present invention relates to a space saving kitchen cutting board and more particularly to a cutting board which can be used on the narrow section of a counter top located at the front edge of a sink.

BACKGROUND OF THE INVENTION

It is common in small kitchens to have a kitchen sink with only a single basin and a compact counter where there is not much space for accommodating a cutting board and other cooking hardware. Cutting boards that can be placed over the sink have been used to address this problem in a small kitchen set up. Unfortunately, such "over-the-sink" type cutting boards hinder a user's accessibility to the sink for washing and other chores since they wholly or substantially obstruct the sink. As a result, over-the-sink cutting boards have to be moved to the side of the sink when some washing or other chores need to be done immediately. Moving over-the-sink cutting boards back and forth could be a messy task because the liquid from the cutting board can drip onto other areas of the counter top or the floor. Further, chopping on over-the-sink cutting boards may damage or dent the sink if the sink is not made of a higher gauge material.

The over-the-sink cutting boards available on the market usually incorporate a strainer. A further disadvantage of such boards is that a large hole is typically formed on the cutting board surface to hold the strainer, thus leaving little room for cutting. Such cutting boards therefore have some difficulty in handling tasks like cutting large leafy vegetables or preparing food for a larger party, especially when there is only a single-basin kitchen sink. The unused food typically goes into the strainer, which is removed for disposing the waste into the trash bin. The periodic act of removing waste from the strainer to the trash bin can be messy.

What is therefore desired is a novel cutting board which overcomes the limitations and disadvantages of prior boards. Preferably, it should be readily supportable over a sink from the narrow section of counter at the front of the sink proximate a user, to provide a cutting surface without occupying much of the sink and other useful counter top space. In particular, the board should include a ready mean of securing about the counter's edge, such as a hooking or clamping mechanism, to prevent the cutting board from toppling into the sink, particularly during food preparation. The board should further incorporate a removable receptacle at one end, and means for optionally hanging a plastic trash bag into which scraps can be conveniently deposited from the board.

SUMMARY OF THE INVENTION

The cutting board of the present invention addresses the drawbacks discussed above. The present cutting board uses the narrow section of the kitchen counter, located at the front edge of a sink, to support the board for cutting or chopping tasks. This small and narrow counter area has never been useful for any other cooking and washing chores, but this is the best location to cut up fresh vegetables, fruits and meat because it is right in front of the sink. The board of this invention occupies very little sink space, and does not unduly impede a user's access to the sink and water taps.

Accordingly, in one aspect the present invention provides a cutting board having an elevated planar cutting surface supported by a narrow base, resulting in overhanging front and back portions of the cutting surface. In a preferred embodiment the back portion protrudes further from the base than the front portion so that more of the cutting surface extends over the sink than in front of the counter.

The cutting board further has a mean of securing that allows the cutting board to be hooked around the counter edge to prevent the cutting board from toppling during use, as when cutting, chopping or slicing food. The securing mean has a pair of clamp assemblies each of which is mounted on a respective downwardly protruding leg from the base. Each clamp assembly has a thumb screw, adjustable right angled member, washer and a plate with a threaded hole which function to grip about the counter's edge.

When installing the cutting board to the counter edge, each clamp assembly is loosened by turning the thumb screw so that the counter edge can easily slide within the base of the cutting board and the adjustable right angled member. To set the gap for the countertop thickness, the user simply compresses the planar cutting surface and adjustable right angled member together so that the edge of the kitchen counter is lightly clamped therebetween, and the thumb screw is then tightened. Since the edge of the counter is only lightly clamped, the cutting board can be easily removed from the counter edge by sliding it out horizontally and later re-inserting it back to the counter edge. This process can be repeated many times without having to adjust the thumb screws once the gap is set.

The cutting board also has attachment features for holding a receptacle at the far end of the cutting board's back portion. The receptacle, as well as the board's cutting surface, is molded from a food grade plastic. Further, a hook is integrally molded at each lateral edge of the cutting board at the front portion and is used to support a two-handle or similar plastic bag which can hang in front of the counter. When cutting the food, unwanted food can be disposed into the hanging bag at the side of the board and the desired, or processed, food can be swept or tossed into the receptacle at the far end of the board.

Upstanding ridges are formed along three sides of the planar cutting surface, namely along the near or front edge and along the adjoining lateral edges, but is omitted from the back or far edge. As the planar cutting surface is inclined at an angle towards the sink when mounted on the counter, any liquid collected on the planar cutting surface should flow toward the back edge and drip is into the sink. The ridges guide the liquid toward the back edge and impede or prevent liquid from dripping off the sides of the cutting board onto the counter or off the front edge onto the user or the kitchen floor.

BRIEF DESCRIPTION OF THE DRAWING FIGURES

Embodiments of the invention will now be described, by way of example only, with reference to the accompanying drawings, wherein.

DETAILED DESCRIPTION OF THE PREFERRED ENBODIMENTS

Figure 1:
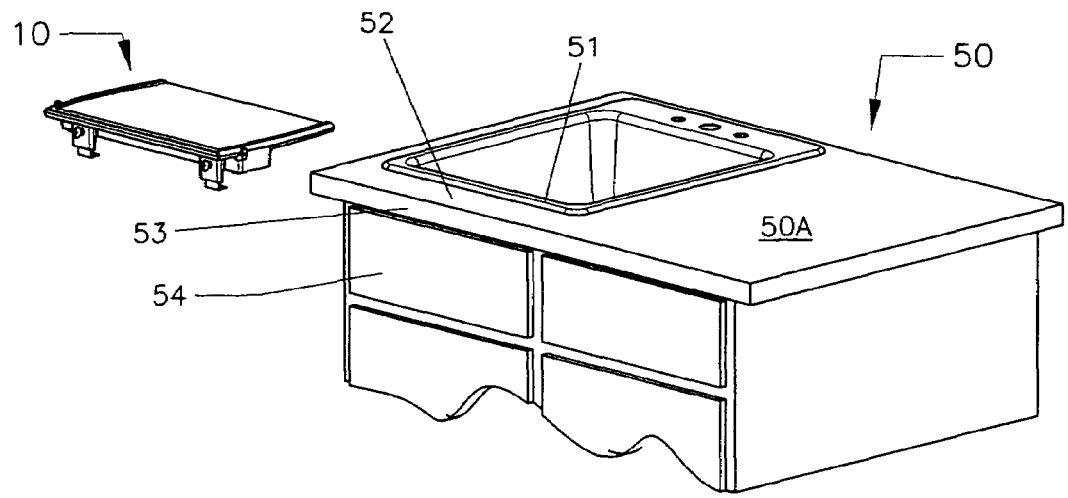
FIG. 1 shows cutting board according to a preferred embodiment of the present invention and a kitchen counter with sink for mounting thereto.

Referring first to FIG. 1, a counter 50 defines a kitchen counter top and a sink 51 mounted therein, which results in a narrow strip of counter 52 running along the front edge of the sink. That front counter strip 52 is typically too narrow to be useful for any cooking and washing chores. The width of this narrow counter strip 52 ranges from one inch to more than five inches (about 25 to 125+ mm), but in most kitchens the width is usually in the range of two to four inches (about 50 to 100 mm). The applicant has found that this narrow strip 52 can be used for mounting a space saving kitchen cutting board, a first embodiment of which is generally designated by reference numeral 10. This location is ideal for chopping or cutting up fresh vegetables, fruits and meats because it is right in front of the sink. Furthermore, the front edge 53 of most kitchen counters usually protrudes out from the front cabinet panels 54, and so can be advantageously used as a securing feature to prevent the cutting board 10 from toppling toward or into the sink 51.

The terms "front" or "forward", "rear" or "backward", "upper", "lower" and the like will be used for identifying certain features of the cutting board and the counter. The use of these terms is not intended to limit the board's use or orientation. Further, when decribing the invention, all terms not defined herein have their common art-recognized meaning. Also, the present description will refer mostly to the top-mounted type of sink 51 where its rim rests on the counter top 50A. However, it will be understood that the present invention is equally applicable to other types of sinks, as long as the counter (or like surface in front of the sink) has a front counter strip 52 and edge 53 to which the cutting board is to be mounted.

Figure 2:
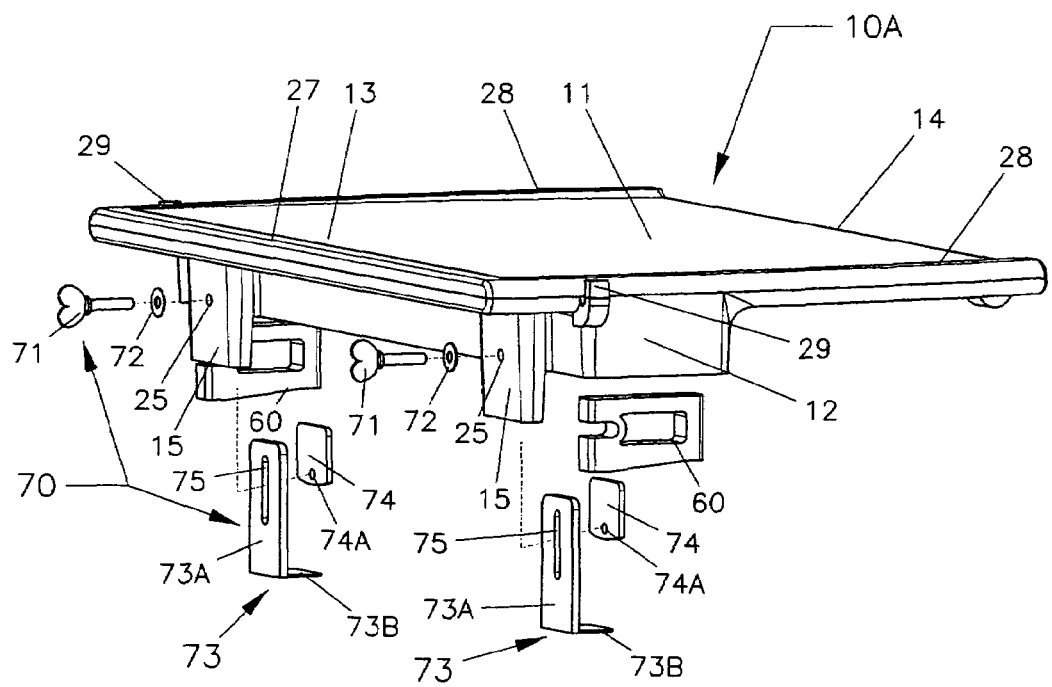
FIG. 2 is a close-up of the cutting board of FIG. 1 showing an exploded view of a the board's clamp assemblies.

Referring now to FIG. 2, the cutting board 10 has a main cutting platform 10A and a securing means 70 in the form of two like but spaced clamp assemblies. The platform 10A is molded from a food grade plastic, although other suitable materials may be used, such as wood (as discussed later). The platform 10A has a top planar cutting surface 11 which is elevated by a narrow base 12 which is either molded integrally with the platform underneath or is otherwise connected thereto. The narrow base 12 results in overhanging first and second, or front and back, portions 13 and 14 of the platform. In this embodiment the back portion 14 protrudes further from the base 12 than the opposed front portion 13 so that more of the platform extends over the sink than beyond the counter's front edge 53.

Each of the clamp assemblies 70 has a thumb screw 71 (or like fastener) and associated washer 72, a L-shaped bracket 73 with a leg portion 73A and a foot portion 73B, and a plate member 74 with threaded hole 74A therethrough. The leg portion 73A has an elongate slot 75 through which the thumb screw 71 is adapted to pass. These clamp parts are preferably made of stainless steel material to avoid corrosion. Each assembly 70 is adapted to be secured to the back side (i.e. the side facing the board's back edge 14) of a respective leg 15 which protrudes away, or downwardly, from the base 12. Each clamp assembly is secured by passing the thumb screw 71 (with washer 72 thereon) from the front of the base through a hole 25, then through the slot 75 of the bracket 73, and into threaded engagement with the hole 74A of the plate member 74 (see additional views in FIGS. 3 & 5). The thumb screw 71 acts to clamp the leg 73A between the plate member 74 and the back side of the leg 15. A user may therefore use the thumb screw 71 to selectively slide the bracket to adjust the spacing of the bracket's foot 73B from the base within the range of the elongated slot 75. Therefore, each clamp assembly 70 can be adjusted to fit a standard range of counter thicknesses. The adjustable bracket 73 is preferably insert-molded with wear resistant and non-scratch plastic or rubber material to avoid damaging the counter. In this preferred embodiment two legs 15, and their corresponding clamp assemblies 70, are provided near each end of the base 12 for stable and secure mounting to the counter. It will be appreciated that a single leg 15 and clamp assembly 70 may be sufficient to prevent the cutting board from toppling, but such arrangement is not preferred.

Upstanding and adjoining ridges are formed along three sides of the cutting surface 11, namely a ridge 27 along the front edge (closest to a user) of the cutting platform 10A, and a ridge 28 along each lateral edge of the cutting platform. A ridge is omitted from the back edge. The planar cutting surface 11 is also inclined relative to the base 12 at an angle downwardly towards the sink. This arrangement urges liquids on the cutting surface toward the back edge and into the sink. The ridges 27 and 28 also impede or prevent any liquid from dripping off the front and lateral sides of the cutting board.

Figure 3:
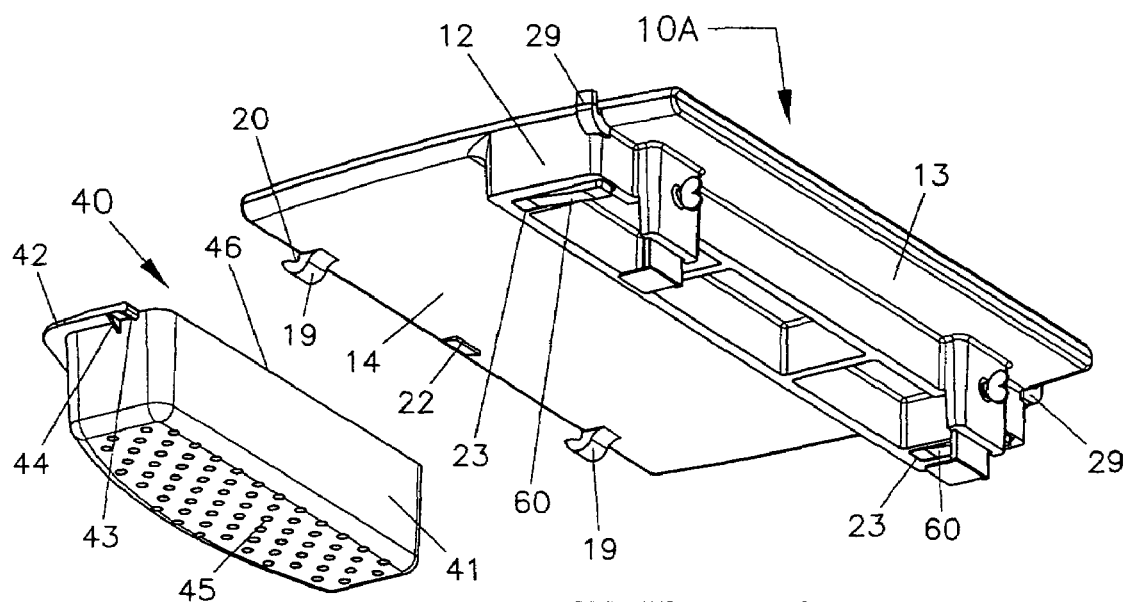
FIG. 3 is a perspective view from below the cutting board of FIG. 1, and a receptacle for attachment to the back edge of the cutting board.
Figure 5:
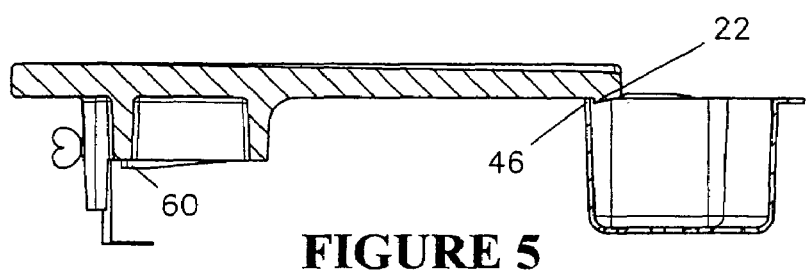
FIG. 5 is a longitudinal cross-section of the cutting board and receptacle in FIG. 4 along line 5—5.

Referring now to FIGS. 2 and 3, the base 12 is preferably integrally molded to the bottom of the cutting platform 10A. The base is substantially hollow to reduce material and weight, and thus is formed of a series of interconnected walls for structural integrity. A rectangular hollow compartment 23 is formed at each end of the base 12 to house a non-skid pad 60. The non-skid pads 60 are preferably made of a compressible material, such as a soft rubber or plastic, and configured to protrude slightly below the base (preferably tapered outwardly toward the front end as best seen in FIG. 5) so as to engage the counter. The non-skid pads 60 are compressed when the cutting board is mounted to the counter edge to enhance frictional resistance therebetween, and to allow the bottom of the base to fully contact the counter and rest evenly thereon. The non-skid pads 60 are particularly useful when used on a smooth counter surface, and they help prevent the cutting board from sliding away from the sink.

One or more upturned hooks 29 are integrally molded at both sides of the cutting platform 10A at the front portion thereof. The hooks 29 are used to support a two-handle plastic bag or other like trash bag. The location of each hook 29 is configured so that after mounting the cutting board to the counter edge, the hook 29 is near the vertical plane of the counter edge in order to minimize the moment generated from the weight of the trash bag suspended on the hook. In other words, the hook is located such that the trash bag hangs beside the counter's edge and minimizes any forces which might urge the cutting board to flip away from the sink.

Figure 4:
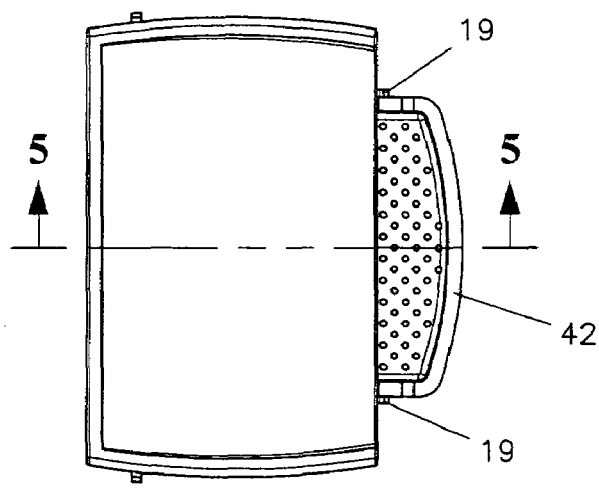
FIG. 4 is a plan view of the cutting board of FIG. 1 and of the receptacle of FIG. 3 mounted to the back edge of the cutting board.

Referring now to FIGS. 3 to 5, a further feature of the invention is a receptacle 40 for mounting at the back of the cutting platform 10A. The receptacle has a main container portion 41 and a flange 42 extending along three sides of the container's lip. Reinforcing ribs 44 are placed at intervals underneath the flange 42. A ridge 43 is formed at each terminal end of the flange 42, and the profile of each ridge 43 matches that of a groove 20 in a receptacle support 19 for mating therewith. The base of the receptacle 40 preferably has perforations 45 for liquid drainage.

Attachment means for the receptacle 40 to the cutting board is provided by a pair of spaced receptacle supports 19 integrally molded underneath the cutting platform 10A adjacent its back edge. The distal end of each support protrudes away from the back edge and forms a groove 20 adapted to mate with the respective ridge 43 of the receptacle 40. A forwardly protruding wedge-shape latch 22 is formed underneath the cutting platform 10A intermediate the supports 19 to help retain the receptacle on the supports. The receptacle supports are spaced a distance which is slightly larger than the length of the main container 41.

When attaching the receptacle 40 to the cutting board 10, the front upper edge 46 of the receptacle (i.e. the one without the flange 42) is slid between the receptacle supports 19 at a slightly downward angle and underneath the cutting platform 10A. When the receptacle 40 is fully inserted, the ridges 43 of the flange 42 engage the groove 20 of the respective support 19, and the bottoms of the flange 42 rest on the tips of the receptacle supports 19. The cantilever effect of the receptacle 40 on the supports 19 urges the receptacle's non-flanged upper edge 46 into contact with the bottom of the cutting platform 10A. The latch 22, which ends up being positioned inside the receptacle 40 upon its attachment to the board, abuts the upper edge 46 to prevent the receptacle 40 from inadvertently sliding out. The receptacle 40 is removed by reversing the above process, namely by lifting the back of the receptacle up at an angle to disengage from the latch 22 and sliding it out away from the board.

Figure 6:
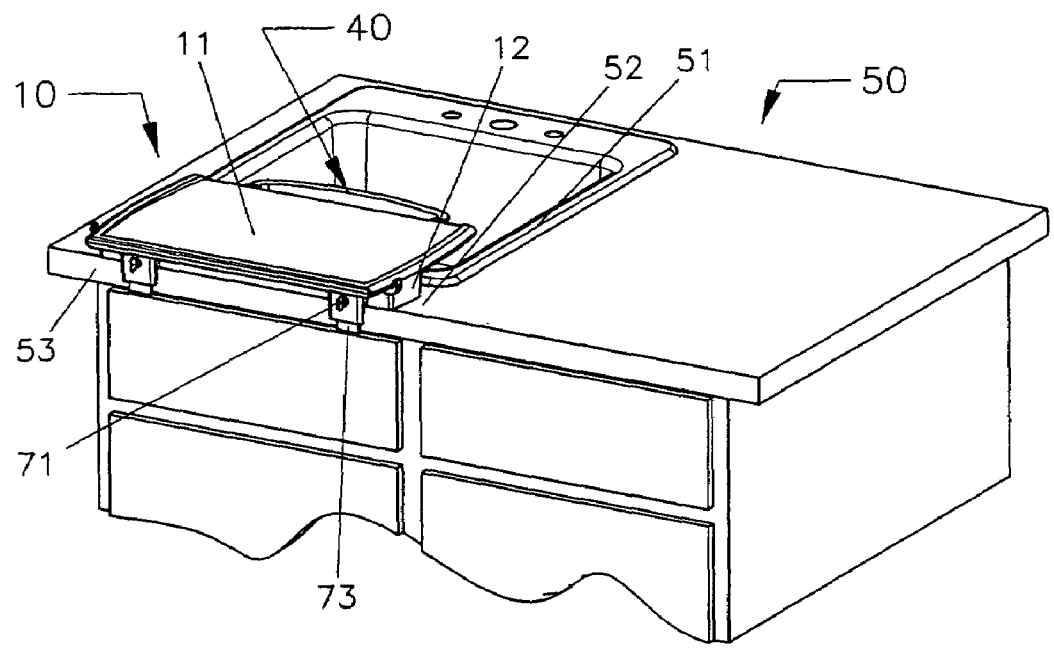
FIG. 6 shows the cutting board and receptacle of FIG. 4 mounted to the front edge of the kitchen counter and extending over a portion of the sink.

Referring next to FIG. 6, when installing the cutting board 10 to the counter's front edge 53, the clamp assemblies 70 need to be loosened by turning the thumb screws 71 so that the counter edge 53 can easily slide between the base 12 and the foot 73B of the adjustable L-shaped bracket 73. To set the gap for that countertop's thickness, a user should simply compress by hand the cutting surface 11 and adjustable brackets 73 together so that the counter edge 53 is clamped therebetween and the thumb screws 71 are then tightened. The foot member 73B of the adjustable bracket 73 is configured to be thin so that it does not block the movement of drawers and cabinet doors under the counter. The above-noted clamping force should be adequately firm to retain the board on the counter, yet not so tight so as to prevent a user from repeatedly sliding the board off the counter and then reinserting the board thereon, without further loosening or adjustment of the clamping assemblies. The gap (between the bracket's foot 73B and base 12) need only be set once for any particular counter. The elevated cutting platform is configured to clear the height of the sink's rim 51.

Once the cutting board is mounted to the counter, food can be cut, sliced or chopped on the cutting surface 11. For small cutting chores, the processed food can be scraped or tossed into the receptacle 40, and the receptacle may be detached from the board for moving the processed food to a desired location, such as into a cooking pot or frying pan. Since the cutting board occupies very little sink space, it does not hinder accessibility to the sink and to the tap water for other washing chores.

Figure 7:
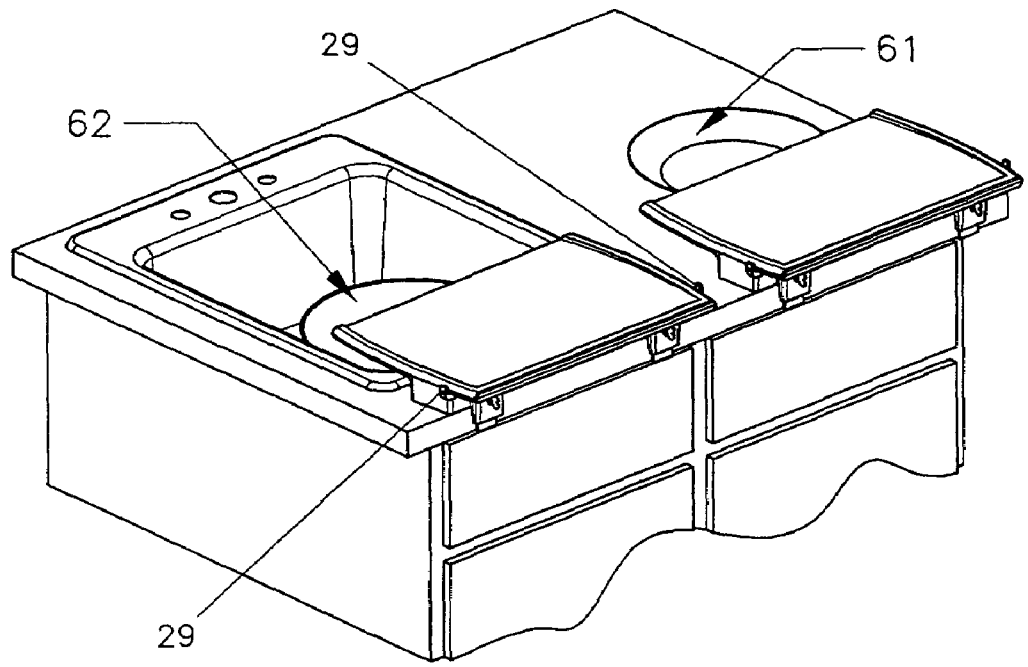
FIG. 7 shows the cutting board of FIG. 1 in two of many possible positions on the counter, namely mounted in front of the sink and another mounted away from the sink.

FIG. 7 illustrates the versatility of the present invention. In a first case for large cutting chores (as illustrated on the left side of FIG. 7), the receptacle may be omitted and a colander 62 is placed in the sink into which the processed food can be scraped or tossed directly. Unwanted food can be trashed into a plastic bag hung from one of the hooks 29. In a second case the cutting board may also be used away from the sink on any flat counter surface to provide a raised cutting surface (as illustrated on the right side of FIG. 7). In this instance a plate 61 or low profile pan is placed underneath the cutting board to catch foods and collect juice from carving. These convenient "chop, catch and trash" features of the board, as illustrated in both cases, allow a user to finish a first cutting chore and quickly free up the cutting surface to start another cutting chore.

Figure 8:
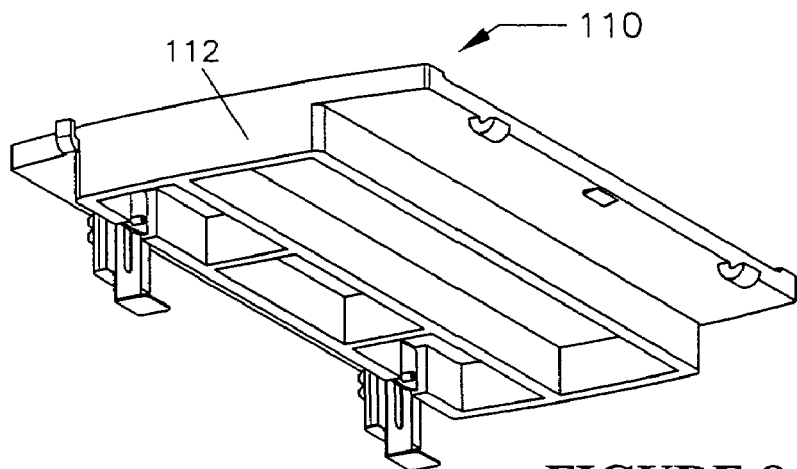
FIG. 8 shows another embodiment of the cutting board of the present invention having a larger base.

FIG. 8 shows an alternate version of the invention in which the cutting board 110 has a larger, namely wider (from front to back), base 112 for added stability on any kitchen counter with under-mount sinks, as the sink's outer rim is always below the counter surface. Otherwise, the cutting board 110 has all the features described for the first embodiment of the cutting board 10.

Figure 9:
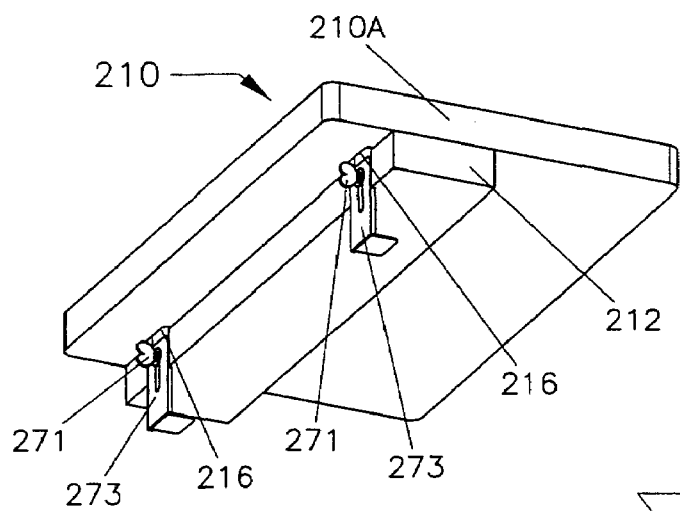
FIG. 9 shows yet another embodiment of the cutting board of the present invention employing a cutting surface made of wood.
Figure 10:
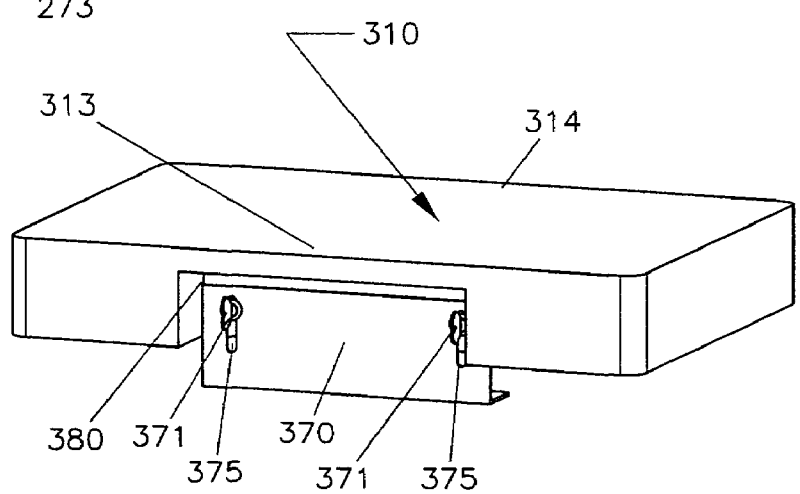
FIG. 10 shows a variant of the wooden cutting board of FIG. 9.

Variants of the securing means 70 may be applied to variants of the cutting board. FIG. 9 shows a solid narrow base 212 (as opposed to the generally hollow narrow base 12) for use with wood chopping board 210. The planar cutting platform 210A and the solid base 212 can be made from a thick solid block of wood as a single integral unit, or by gluing the platform 210A and base 212 together. Blind slots 216 are bored into the platform 210A from underneath, and adjacent the base 212, to allow the brackets 273 to slide thereinto. These slots augment the range of travel of the bracket's foot relative to the base 212 to accommodate a greater range of kitchen counter thicknesses. The heads of thumb screws 271 can be used as hooks for hanging two-handed plastic trash bags. FIG. 10 shows an adjustable single clamp assembly 370 applied to a recess 380 in the edge of a solid thick wooden chopping board 310. The recess 380 is fairly deep to provide a first, or front, portion 313 that extends toward a user when mounted to a counter, much like the front portion 13 of the preferred embodiment, for enhanced ergonomics during use. The board should be sized so that the second, or rear, portion 314 extends over a sink when mounted adjacent thereto. The clamp assembly has a wide L-shaped metal bracket with a pair of spaced, vertically oriented elongate slots 375 adapted to receive respective thumb screws 371. Although one thumb screw and centrally located slot would also work, the pair illustrated is preferred for security. The bracket may slide within the recess 380 for vertical adjustment within the range of the elongate slots, and be fixed at a desired position (namely to the thickness of the kitchen counter edge) by tightening the thumb screws. This slot and clamp configuration allows the omission of a base (12). This variant is useful for any kitchen counters with under-mount sinks. It will be understood that the wood of the cutting boards 210, 310 may be substituted with thick plastic or other suitable materials.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below. For instance, although a single basin sink has been used in the above description, it is understood that the present invention may be used with other types of sinks and those with two or more basins.

I claim:

1. A cutting board for use on a counter comprising:
   a platform having a generally planar cutting surface;
   a base portion beneath said cutting surface for elevating said cutting surface above said counter when placed thereon, wherein said base provides said platform with an overhanging first portion and an opposed overhanging second portion; and,
   means for securing said platform to said counter to removably retain said platform on said counter during use, said securing means comprising at least one clamp assembly having an adjustable L-shaped bracket for engaging said counter.

2. The cutting board of claim 1 further including a fastener operatively engaged with an elongate slot in said bracket to allow a user to selectively adjust said bracket to the thickness of said counter edge.

3. The cutting board of claim 1 wherein said platform is inclined relative to said base to urge drainage of liquids toward an edge of said overhanging second portion.

4. The cutting board of claim 3 further including an upstanding ridge located about a portion of the perimeter of said platform to promote said drainage.

5. The cutting board of claim 1 wherein at least one hook member is provided adjacent the perimeter of said overhanging first portion to support a bag.

6. The cutting board of claim 1 further including a receptacle removably attachable to said second portion of said platform.

7. The cutting board of claim 6 wherein said receptacle has a perforated base for liquid drainage.

8. The cutting board of claim 6 wherein said platform includes spaced supports along said second portion for removably receiving attachment means on said receptacle, and a latch member to urge retention of said receptacle on said supports.

9. The cutting board of claim 8 wherein said receptacle includes a flange extending along a portion of the periphery thereof, and said attachment means comprises a ridge at each end of said flange for mating with one of said supports on said platform.

10. The cutting board of claim 1 wherein a blind slot is located within said platform opposite said cutting surface for slidingly receiving a portion of said L-shaped bracket.

11. A cutting board for use on a counter comprising:
    a platform having a generally planar cutting surface;
    a base portion beneath said cutting surface for elevating said cutting surface above said counter when placed thereon and for providing said platform with an incline for drainage of liquids therefrom; and,
    at least one clamp assembly on said base for securing said platform to said counter during use.

12. A cutting board for use on a counter comprising:
    a platform having a cutting surface:
    a base portion beneath said cutting surface for elevating said cutting surface above said counter when placed thereon;
    said base portion having means for securing said platform to said counter;
    said base portion having a hollow compartment for holding a non-skid pad.

13. A cutting board for use on a counter having an edge comprising:
    a platform having a top surface for food preparation;
    a base beneath said top surface adapted to rest on said counter and to elevate said top surface thereabove, wherein said platform protrudes from a first side of said base to provide a front overhanging portion, and protrudes from a second side of said base to provide a back overhanging portion; and,
    securing means on said base for removably securing said platform to said counter edge comprising at least one clamp assembly having an adjustable L-shaped bracket for engaging said counter edge and exerting a clamping force with said base, said assembly including a fastener operatively engaged with an elongate slot in said bracket to allow a user to slide the bracket relative to said base to accommodate the thickness of said counter.

14. A cutting board for use on a counter having an edge comprising:
    a platform having a top surface for food preparation;
    a base beneath said top surface adapted to rest on said counter and to elevate said top surface thereabove, wherein said platform protrudes from a first side of said base to provide a front overhanging portion, and protrudes from a second side of said base to provide a back overhanging portion;
    means on said base for removably securing said platform to said counter edge;
    wherein an upstanding ridge is located about a portion of the perimeter of said platform and said platform is inclined relative to said base to urge liquid an said top surface to drain off a back edge of said back portion of said platform.

15. The cutting board of claim 14 further including a receptacle removably attachable to said back portion of said platform.

16. The cutting board of claim 15 wherein:
    said platform includes spaced supports on said back portion of said platform for mating with attachment means on said receptacle, and a latch member to help retain said receptacle on said supports; and,
    said receptacle includes a peripheral flange, and said attachment means comprises a ridge at each end of said flange for mating with a respective support of said platform.

17. A cutting board for use on a counter comprising:
    a platform having a generally planar cutting surface and a recess along one edge of said platform;
    means for securing said platform to an edge of said counter to removably retain said platform on said counter during use comprising a clamp assembly having a L-shaped bracket adapted to adjustably engage said recess.

18. The cutting board of claim 17 wherein said bracket includes at least one elongate slot, and said clamp assembly includes a fastener for operatively engaging said slot to allow a user to selectively adjust said bracket to the thickness of said counter edge by fixing the position of said bracket in said recess.

19. A cutting board for use on a counter comprising:
    a platform having a cutting surface;
    a base portion beneath said cutting surface for elevating said cutting surface above said counter when placed thereon;
    at least one clamp assembly on said base portion for securing said platform to said counter during use; and,
    a receptacle removably attachable to a back portion of said platform.

* * * * *